(12) United States Patent
Lapp et al.

(10) Patent No.: US 10,398,074 B2
(45) Date of Patent: Sep. 3, 2019

(54) INTEGRATED JACK STAND FOR AERATOR

(71) Applicant: Schiller Grounds Care, Inc., Southampton, PA (US)

(72) Inventors: Jonathan Lapp, Johnson Creek, WI (US); Mark J. Wegner, Watertown, WI (US)

(73) Assignee: Schiller Grounds Care, Inc., Southampton, PA (US)

( * ) Notice: Subject to any disclaimer, the term of this patent is extended or adjusted under 35 U.S.C. 154(b) by 10 days.

(21) Appl. No.: 15/499,154

(22) Filed: Apr. 27, 2017

(65) Prior Publication Data

US 2017/0311533 A1    Nov. 2, 2017

Related U.S. Application Data

(60) Provisional application No. 62/328,909, filed on Apr. 28, 2016.

(51) Int. Cl.
*A01B 45/02*    (2006.01)

(52) U.S. Cl.
CPC .................... *A01B 45/02* (2013.01)

(58) Field of Classification Search
CPC ............ B60S 9/04; B62H 1/06; A01B 45/02
See application file for complete search history.

(56) References Cited

U.S. PATENT DOCUMENTS

| | | | | |
|---|---|---|---|---|
| 3,106,382 A * | 10/1963 | Theodor | ............. | B60D 1/66 254/419 |
| 3,182,957 A * | 5/1965 | Dalton | .............. | B60S 9/04 254/419 |
| 3,387,821 A * | 6/1968 | Saddler | ............. | B60S 9/10 254/419 |
| 3,595,527 A * | 7/1971 | Douglass | ........... | B60D 1/66 254/420 |
| 4,235,542 A * | 11/1980 | Paterik, Jr. | ........ | B60S 9/12 254/423 |
| 6,062,545 A * | 5/2000 | Peavler | ............. | B60D 1/66 254/418 |
| 6,851,253 B2 | 2/2005 | Fontanes, II et al. | | |
| 6,895,648 B1 * | 5/2005 | Willett | .............. | B60S 9/12 254/423 |
| 7,296,784 B2 * | 11/2007 | Peter | ................. | B60S 9/12 254/418 |
| 8,348,241 B2 * | 1/2013 | Trowbridge | ..... | B60D 1/06 254/418 |
| 8,783,660 B1 * | 7/2014 | Riddle | .............. | B60S 11/00 254/418 |

(Continued)

*Primary Examiner* — Drew J Brown
(74) *Attorney, Agent, or Firm* — Panitch Schwarze Belisario & Nadel LLP

(57) ABSTRACT

A vehicle includes a chassis, a pair of wheels rotatably mounted to the chassis, and a jack stand having an extended portion and a support portion. The extended portion has a longitudinal axis. The support portion is located at a longitudinal end of the extend portion. The jack stand is arranged on the chassis to be slidable with respect to the chassis in a direction generally parallel to the longitudinal axis for movement between a deployed position, wherein the support portion is located vertically below a bottom surface of each wheel, and a stowed position, wherein the support portion of the jack stand is located vertically above the bottom surface of each wheel.

14 Claims, 3 Drawing Sheets

(56) References Cited

U.S. PATENT DOCUMENTS

| | | | |
|---|---|---|---|
| 8,910,924 B2* | 12/2014 | Alanko | B60S 9/08 254/418 |
| 2005/0189528 A1* | 9/2005 | Rincoe | B60S 9/04 254/424 |
| 2007/0221900 A1* | 9/2007 | Giralde | B60S 9/08 254/418 |
| 2009/0057633 A1* | 3/2009 | Beck | B60D 1/66 254/420 |
| 2013/0334480 A1* | 12/2013 | Daniel | B60S 9/12 254/419 |
| 2015/0197220 A1* | 7/2015 | Lusty | B60S 9/08 254/420 |

* cited by examiner

INTEGRATED JACK STAND FOR AERATOR

CROSS-REFERENCE TO RELATED APPLICATIONS

This application claims the benefit of U.S. Provisional Patent Application No. 62/328,909, filed on Apr. 28, 2016, entitled "Integrated Jack Stand for Aerator," the entire contents of which are incorporated by reference herein.

BACKGROUND OF THE INVENTION

An embodiment of the present invention relates generally to aerators or other similar earth-working machines, and more particularly, to an integrated jack stand for use in an aerator.

The most desirable location for tines in a large, self-propelled, drum-type aerator is between the rear drive wheels. However, this location typically limits the space available for drive mechanisms other than chain drives. The chain requires periodic lubrication, and some operators are advised to lubricate the chain daily or before each use. A conventional technique involves cycling the chain past a lubricator for a full revolution in order to lubricate the entire chain. Since the wheels are also chain driven, any attempt to perform this method causes the aerator to move away from the technician.

A less frequent service issue is tine replacement. Tines wear out over time and must be replaced. The tines are arranged around the entire diameter of the tine wheels. Since the tine drive is keyed to the wheel drive by the chain, when the tines turn, the wheels turn. To rotate the tine wheel would require the aerator to drive forward or backward from the technician attempting to swap out the tines.

One solution is to support the aerator on blocks to prevent travel on the drive wheels, thereby allowing access to the chain and/or the tines for the necessary procedures. This solution is inconvenient since blocks must be procured, available when and wherever needed, and can be lost. It is particularly difficult to keep the blocks with the aerator when out in the field. Another solution is to lubricate a short portion or section of the chain or remove/replace a small number of tines, then drive the aerator forward or rearward a short distance to address the next section. The procedure is repeated until service of the entire chain and/or all tines is completed. This solution is also not ideal since tools and equipment must be moved with the aerator at each iteration. Furthermore, when performing service indoors, such as in a garage or a shop, space to move the machine fore and aft may not be available. For lubrication especially, it can be difficult to ensure that all of the chain links have been properly serviced. The procedure is also more time consuming, which is worrisome in an industry having a short season. As a result, service is less likely to be performed on an optimal schedule since operators will not risk the required down time for their equipment.

Other conventional types of service for the aerator, such as addressing flat tires, replacing tires, or the like, can cause similar issues.

It is therefore desirable to provide a method for allowing convenient service of tines and the associated chain drive mechanisms or other aspects of the aerator while minimizing the time period in which the aerator is out of service.

BRIEF SUMMARY OF THE INVENTION

Briefly stated, one preferred embodiment of the present invention comprises a vehicle including a chassis, a pair of wheels rotatably mounted to the chassis, and a jack stand having an extended portion and a support portion. The extended portion has a longitudinal axis. The support portion is located at a longitudinal end of the extend portion. The jack stand is arranged on the chassis to be slidable with respect to the chassis in a direction generally parallel to the longitudinal axis for movement between a deployed position, wherein the support portion is located vertically below a bottom surface of each wheel, and a stowed position, wherein the support portion of the jack stand is located vertically above the bottom surface of each wheel.

Another embodiment of the present invention comprises an integrated jack stand for a vehicle. The vehicle includes a chassis and a pair of wheels rotatably mounted to the chassis. The jack stand includes an extended portion having a longitudinal axis and a support portion located at a longitudinal end of the extended portion. The jack stand is arranged on the chassis to be slidable with respect to the chassis in a direction generally parallel to the longitudinal axis for movement between a deployed position, wherein the support portion is located vertically below a bottom surface of each wheel, and a stowed position, wherein the support portion of the jack stand is located vertically above the bottom surface of each wheel.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 1:
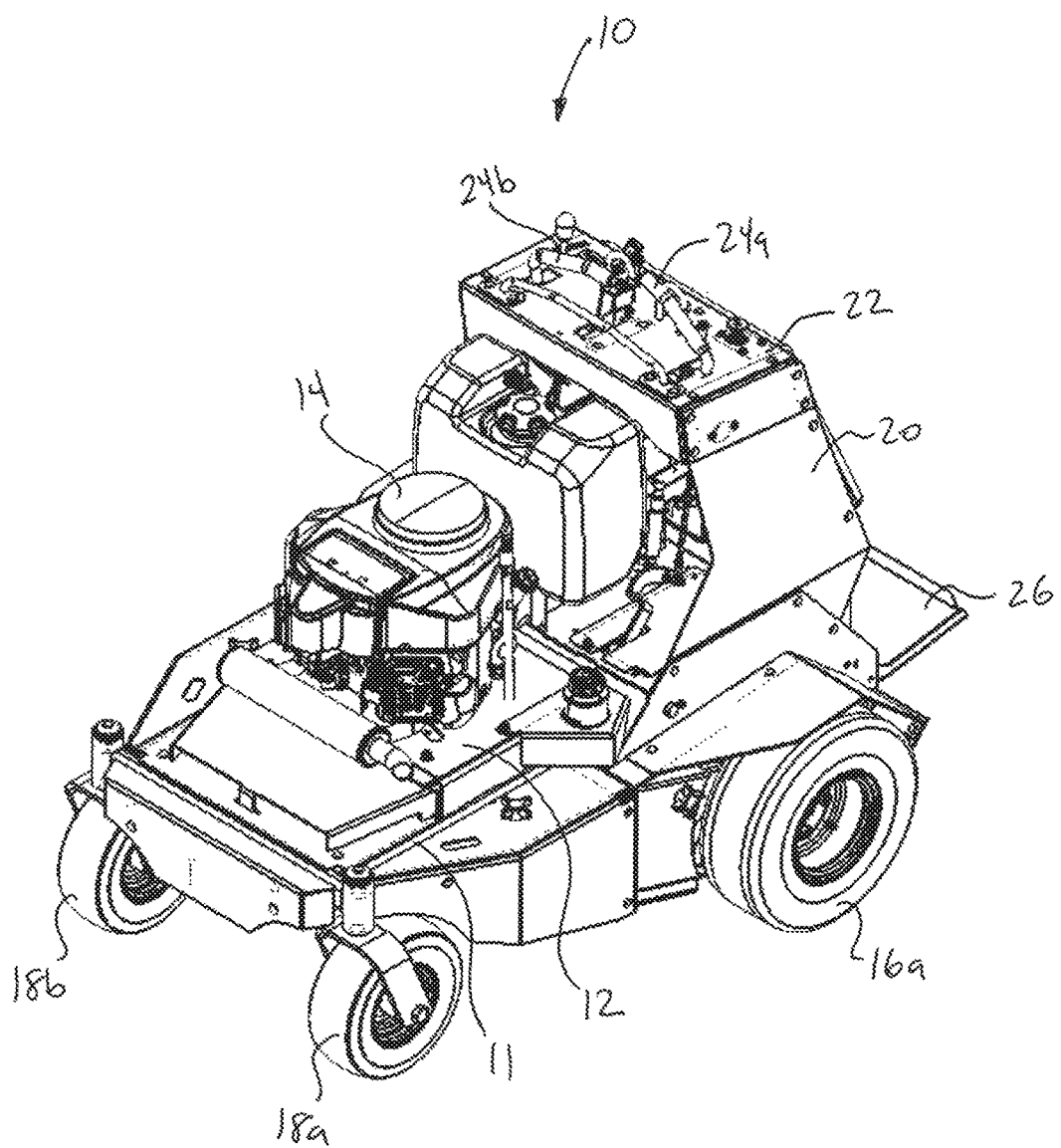
FIG. 1 is a front perspective view of an aerator utilizing the integrated jack stand in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Figure 2:
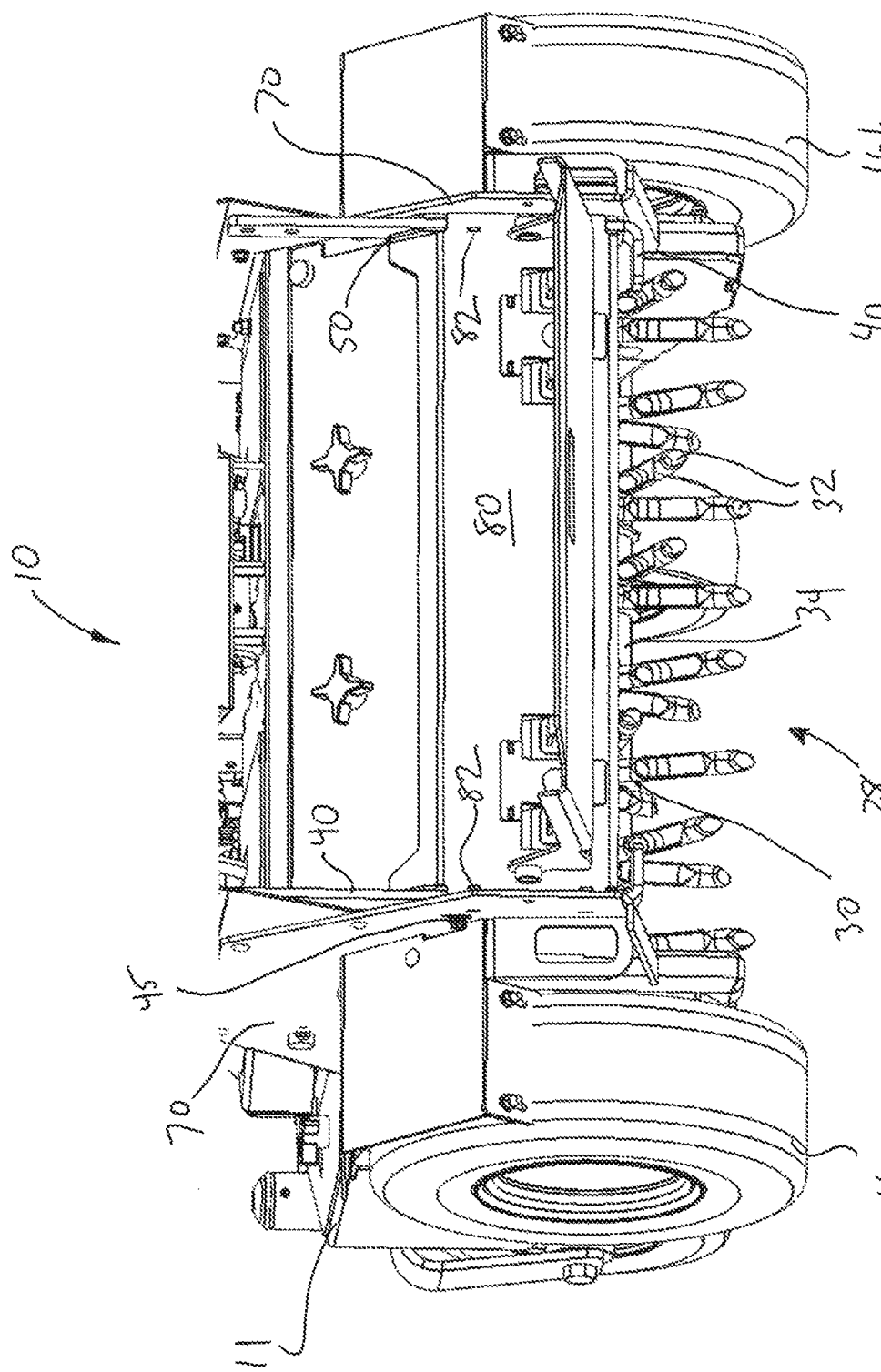
FIG. 2 is a partial rear perspective view of the aerator of FIG. 1.

Referring to the drawings in detail there is shown in FIGS. 1 and 2 an aerator 10 in accordance with a preferred embodiment of the present invention. The aerator 10 includes a chassis 11 having an engine deck 12 supporting an engine 14 that supplies rotational energy for driving left and right drive wheels 16a, 16b rotatably mounted at a rear of the chassis 11. Preferably, the drive wheels 16a, 16b are independently rotatable in forward and reverse directions by corresponding left and right integrated transaxles (not shown) that are operationally coupled to the engine 14. A pair of driven wheels 18a, 18b are supported at a front end of the chassis 11, and are preferably free to rotate as the drive wheels 16a, 16b move the aerator 10 along the ground.

The chassis 11 further supports a control tower 20 mounted rearwardly of the engine deck 12. A control panel 22 is arranged atop the control tower 20 to allow an operator to control movement and operation of the aerator 10. In particular, the control panel 22 includes a pair of traction levers 24a, 24b that are respectively coupled to a corresponding transaxle for actuating forward or reverse rotation of the corresponding drive wheels 16a, 16b. Movement of one of the traction levers 24a, 24b in the forward direction results in rotation of the corresponding drive wheel 16a, 16b in the forward direction, with reverse movement of the traction lever 24a, 24b resulting in reverse rotation of the corresponding drive wheel 16a, 16b. Thus, the aerator 10 provides zero-turn capability through independent forward and reverse operation of the drive wheels 16a, 16b. Other types of controls, such as a parking brake, tine bank lift actuator, or the like may also be utilized on the control panel 22.

The aerator 10 is preferably a stand-on machine, and is therefore preferably equipped with a stowable platform 26 mounted at a rear of the chassis 11. In FIGS. 1 and 2, the platform 26 is shown in its support position, extending generally horizontally for supporting a standing operator. However, the platform 26 is pivotally coupled to the chassis 11 so as to be movable to a nearly vertical position to allow the aerator 10 to be operated as a walk-behind machine. While the aerator 10 is shown as primarily utilizing a stand-on mode of operation, embodiments of the invention described herein may be utilized with any type of riding, stand-on, or walk-behind configurations.

A tine bank 28 is partially visible in FIG. 2 and includes a plurality of tine wheels 30, each of which is rotatably mounted to the chassis 11 and includes a plurality of circumferentially spaced tines 32 extending radially outwardly from a center of the tine wheel 30. The tine wheels 30 are preferably arranged for rotation on a tine shaft 34 that extends between the left and right drive wheels 16a, 16b and parallel to a rotational axis thereof. Preferably, the tine shaft 34 is divided into multiple sections to allow for differential rotation of the tine wheels 30. For example, a left-side portion of the tine shaft 34 may be rotatably connected to the left transaxle. As a result, tine wheels 30 mounted to the left-side portion of the tine shaft 34 may generally rotate in step with the left drive wheel 16a. Similarly, a right-side portion of the tine shaft 34 may be rotatably connected to the right transaxle.

The tine bank 28 is also preferably able to be raised and lowered with respect to the chassis 11, specifically for the purpose of placing the tine wheels 30 into contact with the surface to be aerated and removing the tine wheels 30 from the surface for transport. A hydraulic cylinder (not shown) is preferably connected to the tine bank 28 and is used to move the tine bank 28 between the aeration and transport positions.

Figure 3:
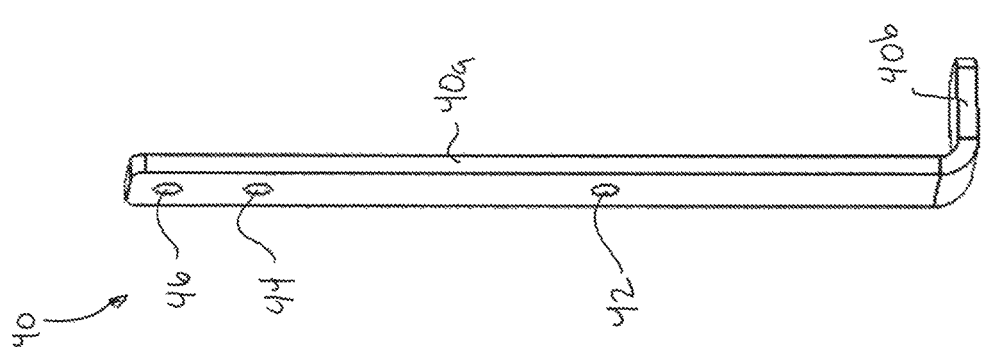
FIG. 3 is a rear perspective view of a jack stand of the aerator of FIG. 1.

Two integrated jack stands 40 are preferably provided on opposing left and right sides of the chassis 11. Each jack stand 40 is preferably provided at a location between a respective drive wheel 16a, 16b and the platform 26. Referring to FIG. 3, each jack stand 40 is preferably in the form of an L-shaped bar, having an extended portion 40a and a support portion 40b extending generally perpendicularly with respect to the extended portion 40a. The extended portion 40a has a longitudinal axis. In use, the support portion 40b contacts the ground or other surface to support the aerator 10 as it is raised up for servicing. When arranged on the aerator 10, the support portion 40b preferably extends from a longitudinal end of the extended portion 40a toward a center of the aerator 10, although the support portion 40b may extend in any direction (e.g., toward the adjacent drive wheel 16a, 16b, toward the front or rear of the aerator 10, or the like) provided it does not interfere with any other component of the aerator 10.

The extended portion 40a preferably includes at least a first opening 42 and a second opening 44 extending therethrough. The first opening 42 is sized to receive a pin 45 (FIG. 2) that locks the jack stand 40 in place relative to the chassis 11 in a stowed position (FIG. 2), wherein the support portion 40b is located vertically above a bottom surface of each drive wheel 16a, 16b, which allows for normal operation of the aerator 10. The support portion 40b is raised above the ground or other surface and the drive wheels 16a, 16b contact the ground and move the aerator 10. The second opening 44 is also sized to receive the pin 45 in order to lock the jack stand 40 in place relative to the chassis 11 in a deployed position (not shown), wherein the support portion 40b of the jack stand 40 is vertically below the bottom surface of each drive wheel 16a, 16b and contacts the ground or other surface to lift the aerator 10, and particularly the drive wheels 16a, 16b, off of the ground or other surface to permit, for example, access to the tine bank 28 or other components beneath the aerator 10. For an aerator specifically, it is also preferred that the stowed and deployed positions have the support portion 40b of the jack stand 40 be respectively located vertically above and below a bottom surface of each of the tines 32.

At least one additional opening 46 that is sized to receive the pin 45 may be provided in the extended portion 40a of the jack stand 40. In FIG. 3, the additional opening 46 is provided above the second opening 44, and therefore would allow the aerator 10 be lifted higher off of the ground or other surface than the second opening 44. In other embodiments, a series of openings (not shown) may be provided that are spaced apart along the vertical portion equidistantly to allow a range of heights for lifting the aerator 10. In other embodiments, an elongate slot (not shown) may be provided in the extended portion 40a with at least two tabs or hooks (not shown) extending into the slot for supporting the jack stand 40 in the stowed and deployed positions on the pin 45. In other embodiments, the extended portion 40a may include a pin or other protrusion (not shown) that is configured to engage a slot or openings on the chassis 11 of the aerator 10. The jack stand 40 can also be maintained in place by frictional or other binding forces with other components of the aerator (such as a sleeve 50, described in more detail below) or the like. Thus, different mechanisms for locking the jack stands 40 in place with respect to the chassis 11 may be used without departing from the spirit and scope of the invention.

In addition, while each jack stand 40 is shown in the form of an L-shaped bar, other forms may be used as well. For example, the jack stand 40 may be an inverted T-shape (not shown) where the support portion 40b extends in two opposing directions perpendicularly from the extended portion 40a. The support portion 40b may take any shape that can be used to support the weight of the aerator 10. Moreover, the extended portion 40a is shown as flat in FIG. 3, but could be rounded, or take other shapes without departing from the spirit and scope of the invention.

Figure 4:
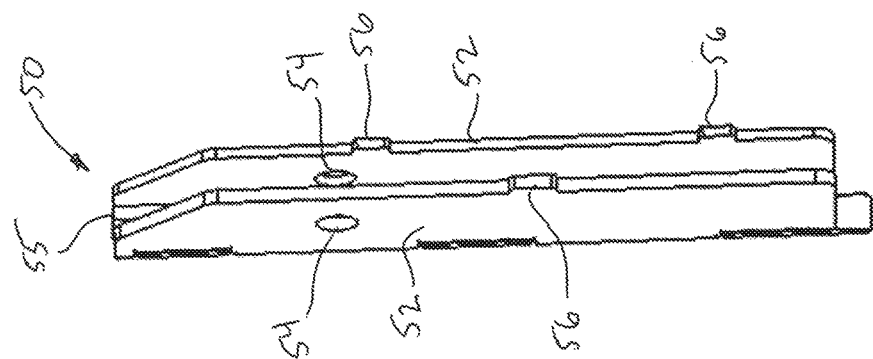
FIG. 4 is a rear perspective view of a sleeve that partially houses the jack stand of FIG. 3.

Referring to FIGS. 2 and 4, each jack stand 40 is preferably partially housed and translatable or slidable, in a direction generally parallel to the longitudinal axis of the extended portion 40a, within a corresponding sleeve 50 coupled to the chassis 11. In preferred embodiments, the longitudinal axis of the extended portion 40a and the translation or sliding direction is preferably oriented generally vertically. In the present embodiment, each sleeve 50 includes a pair of opposed, parallel, vertically extending flaps 52. When assembled, the flaps 52 surround the left and right side faces of the extended portion 40a of the jack stand 40. Accordingly, each flap 52 is preferably provided with a through-hole 54 that can be aligned with the first opening 42 when the jack stand 40 is in the stowed position, and aligned with the second opening 44 or additional openings 46 when the jack stand 40 is extended for deployment. In this way, the pin 45 enters the through-hole 54 of one of the flaps 52, traverses one of the desired openings 42, 44, 46 in the jack stand 40, and exits the through-hole 54 in the opposing flap 52 to secure the jack stand 40 in place.

In the embodiment shown in FIG. 2, the outer flap 52 of each sleeve 50 is secured to a side plate 70. The side plates 70 not only provide a location to secure the sleeves 50 to the chassis 11, but also provide reinforcement to the sleeves 50 and a broader surface for supporting the aerator 10 when lifted by the jack stand 40. The side plate 70 includes a pin-hole (not shown) aligned with the through-holes 54 of the flaps 52 of the sleeve 50 to allow entry of the pin 45 for securing the jack stand 40. Preferably, the outer flap 52 of each sleeve 50 is welded to the corresponding side plate 70, although other methods of attachment, such as mechanical fasteners or the like, can be used as well.

It is further preferred to prevent forward or reverse pivoting of the jack stand 40 within the sleeve 50. In the embodiment shown in FIGS. 2-4, at least one of the flaps 54 of the sleeve 50 includes a bent portion 55 that connects to the opposing flap 54. The connection may be made by welding, interference fit, mechanical fasteners, or the like. The bent portion 55 forms a front wall for the sleeve 50. A back wall (not shown) may be formed similarly. However, in this particular embodiment, the sleeve 50 is open at a back side thereof. Instead, as seen in FIG. 2, a back end of the sleeve 50 abuts against a kick panel 80 that is used with the platform 26. The kick panel 80 preferably includes a plurality of slots 82 which align with corresponding rearwardly extending tabs 56 on the flaps 54 of the sleeve 50 for securing the kick panel 80 to the sleeve 50. Other configurations of the sleeve and methods of securing the sleeve 50 to the chassis 11 can also be used without departing from the spirit and scope of the invention.

In use, the operator preferably deploys a jack stand 40 by first removing the pin 45 from at least one through-hole 54 of the sleeve 50 and the first opening 42 in the jack stand. The pin 45 may be fully removed or may remain partially inserted in the opening of the side plate 70, for example. The jack stand 40 is then lowered to the ground or support surface either by gravity or by force exerted by the operator, such as by stepping or pulling on the support portion 40b. The rear end of the chassis 11 is preferably lifted by the operator, such as by using the hydraulic cylinder's down force to lower the tine wheels 30 relative to the chassis 11, which when done on a hard surface will raise the chassis 11 and drive wheels 16a, 16b from the ground. Once the pin 45 is inserted to lock the jack stand 40 in place, the hydraulic force is reversed so that the weight of the machine is transferred from the tines 32 and tine wheels 30 to the jack stand 40. This can also be accomplished by grasping the adjacent drive wheel 16a or a secure portion of the chassis 11, until a desired height is reached that corresponds to one of the second or additional openings 44, 46 of the jack stand 40. The pin 45 is reinserted to lock the jack stand 40 in place. The procedure may be repeated for any additional jack stands 40.

To replace the jack stand 40 to its stowed position, the operator preferably again uses the hydraulic cylinder's down force to lower the tine wheels 30 relative to the chassis 11, which when done on a hard surface will raise the chassis 11 and drive wheels 16a, 16b from the ground. Once this weight of the machine is on the tines 32 and tine wheels 30, the pressure on the pin 45 is relieved, allowing its removal. The jack stand 40 can thereafter be slid back into the chassis 11 to the transport position and the pin 45 can be reinstalled. After the pin 45 is reinstalled with the jack stand 40 in the transport position, the hydraulic force can be reversed and the machine will come to rest on the drive wheels 16a, 16b. This can also be accomplished by lifting the chassis 11 off of the ground by other means, and the pin 45 can be removed and the jack stand 40 can be slid back up in the chassis 11 to the transport position prior to reinstallation of the pin 45.

While the aerator 10 is shown as having two jack stands 40 integrated therein, the aerator 10 may have any number of integrated jack stands while still keeping within the spirit and scope of the invention. Depending on the location, weight distribution, and the like, one jack stand 40 may be sufficient, while in other cases, three or more jack stands 40 may be necessary.

While an aerator 10 is shown in FIGS. 1-2, it is understood by one skilled in the art that the embodiments of the invention described herein may be utilized with other types of earth-working machines requiring servicing for components located underneath the machine, such as mowers, seeders, tractors, loaders, or the like. Moreover, while the described aerator 10 is a drum-style aerator, it is understood by one skilled in the art that the embodiments of the invention described herein may be utilized with other types of aerators, such as reciprocating aerators, or the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as described above.

We claim:

1. A vehicle comprising:
    a chassis;
    a pair of wheels rotatably mounted to the chassis;
    a jack stand having an extended portion and a support portion, the extended portion having a longitudinal axis, the support portion being located at a longitudinal end of the extended portion, the jack stand being arranged on the chassis and confined to slidable movement with respect to the chassis in a direction generally parallel to the longitudinal axis, the jack stand being movable between a deployed position, wherein the support portion is located vertically below a bottom surface of each wheel, and a stowed position, wherein the support portion of the jack stand is located vertically above the bottom surface of each wheel; and
    a sleeve fixedly mounted to the chassis, the sleeve at least partially housing the extended portion of the jack stand, the extended portion of the jack stand being slidable within the sleeve between the deployed and stowed positions.

2. The vehicle of claim 1, further comprising a removable pin that, when installed, is configured to contact the jack stand in at least one of the deployed position or the stowed position to prevent movement of the jack stand with respect to the chassis.

3. The vehicle of claim 2, wherein the extended portion of the jack stand includes a plurality of openings extending generally horizontally therethrough, each of the openings being sized to receive the pin.

4. The vehicle of claim 3, wherein the sleeve includes a through-hole extending generally horizontally therethrough, each through-hole being sized to receive the pin, the pin being insertable into one of the plurality of openings in the jack stand upon insertion through the through-hole of the sleeve.

5. The vehicle of claim 1, wherein the sleeve includes a pair of opposed, parallel, vertically extending flaps.

6. The vehicle of claim 5, wherein the sleeve further includes a bent portion that connects the two flaps.

7. The vehicle of claim 5, further comprising a kick panel, and wherein each flap includes a rearwardly extending tab for securing the kick panel to the sleeve.

8. The vehicle of claim 1, wherein the extended portion and the support portion form an L-shaped bar.

9. An integrated jack stand for a vehicle, the vehicle including a chassis and a pair of wheels rotatably mounted to the chassis, the jack stand comprising:
   an extended portion having a longitudinal axis; and
   a support portion located at a longitudinal end of the extended portion, the jack stand being arranged on the chassis and confined to slidable movement with respect to the chassis in a direction generally parallel to the longitudinal axis, the jack stand being movable between a deployed position, wherein the support portion is located vertically below a bottom surface of each wheel, and a stowed position, wherein the support portion of the jack stand is located vertically above the bottom surface of each wheel; and
   a sleeve at least partially housing the extended portion of the jack stand, the extended portion of the jack stand being slidable within the sleeve between the deployed and stowed positions.

10. The integrated jack stand of claim 9, further comprising a removable pin that, when installed, is configured to contact at least one of the extended portion or the support portion in at least one of the deployed position and the stowed position to prevent movement of the jack stand with respect to the chassis.

11. The integrated jack stand of claim 10, wherein the extended portion of the jack stand includes a plurality of openings extending generally horizontally therethrough, each of the openings being sized to receive the pin.

12. The integrated jack stand of claim 11, wherein the sleeve includes a through-hole extending generally horizontally therethrough, the through-hole being sized to receive the pin, the pin being insertable into one of the plurality of openings in the jack stand upon insertion through the through-hole of the sleeve.

13. The integrated jack stand of claim 9, wherein the sleeve includes a pair of opposed, parallel, vertically extending flaps and a bent portion that connects the two flaps.

14. The integrated jack stand of claim 9, wherein the extended portion and the support portion form an L-shaped bar.

* * * * *